(12) United States Patent
Sade et al.

(10) Patent No.: US 6,591,335 B1
(45) Date of Patent: Jul. 8, 2003

(54) FAULT TOLERANT DUAL CACHE SYSTEM

(75) Inventors: Gilad Sade, Newton, MA (US); Eli Shagam, Brookline, MA (US); Natan Vishlitzky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 274 days.

(21) Appl. No.: 09/676,686

(22) Filed: Sep. 29, 2000

(51) Int. Cl.$^7$ ............................................... G06F 12/00
(52) U.S. Cl. ..................... 711/113; 711/120; 711/129; 711/162
(58) Field of Search ................................ 711/113, 119, 711/120, 129, 161, 162; 714/9, 6, 14

(56) References Cited

U.S. PATENT DOCUMENTS

| | | |
|---|---|---|
| 5,206,939 A | 4/1993 | Yanai et al. |
| 5,319,766 A | 6/1994 | Thaller et al. |
| 5,390,186 A | 2/1995 | Murata et al. |
| 5,404,500 A * | 4/1995 | Legvold et al. ............... 714/6 |
| 5,437,022 A | 7/1995 | Beardsley et al. |
| 5,640,530 A | 6/1997 | Beardsley et al. |
| 5,724,501 A | 3/1998 | Dewey et al. |
| 5,771,367 A | 6/1998 | Beardsley et al. |
| 5,778,394 A | 7/1998 | Galtzur et al. |
| 5,845,147 A | 12/1998 | Vishlitzky et al. |
| 5,857,208 A | 1/1999 | Ofek |
| 6,073,209 A | 6/2000 | Bergsten |
| 6,073,251 A | 6/2000 | Jewett et al. |
| 6,078,503 A | 6/2000 | Gallagher et al. |

OTHER PUBLICATIONS

Pierre Raymond and John Nguyen, "Hitachi Freedom Storage 7700E Turbo–charges DB2", 1998, pp. 1–6.

* cited by examiner

*Primary Examiner*—Kevin Verbrugge
(74) *Attorney, Agent, or Firm*—Choate, Hall & Stewart

(57) ABSTRACT

Managing data in cache includes providing data from a disk storage area to a first cache memory, providing data from the disk storage area to a second cache memory, where the first and second cache memories contain at least some data that is not stored in the other one of the cache memories, and writing the same data to both of the cache memories in response to the data being modified while stored in the cache memories. Managing data in a cache may also include subdividing the first cache memory into primary and secondary storage areas, subdividing the second cache memory into primary and secondary storage areas, where primary areas of the first cache correspond to secondary areas of the second cache and where secondary areas of the first cache correspond to primary areas of the second cache, and providing data from the disk storage area to the one of the cache memories having a corresponding primary storage area. Managing data in a cache memory may also include subdividing the disk storage area into a plurality of slots, where each of the slots corresponds to a primary area of one of the cache memories and to a secondary area of the other one of the cache memories.

35 Claims, 7 Drawing Sheets

FAULT TOLERANT DUAL CACHE SYSTEM

BACKGROUND OF THE INVENTION

1. Field of the Invention

This application relates to the field of computer data storage and more particularly to the field of using a cache memory in a computer data storage device.

2. Description of Related Art

Host processor systems may store and retrieve data using a storage device containing a plurality of host interface units, disk drives, and disk interface units. Such storage devices are provided, for example, by EMC Corporation of Hopkington, Mass. and disclosed in U.S. Pat. No. 5,206,939 to Yanai et al., U.S. Pat. No. 5,778,394 to Galtzur et al., U.S. Pat. No. 5,845,147 to Vishlizzky et al., and U.S. Pat. No. 5,857,208 to Ofek. The host systems access the storage device through a plurality of channels provided therewith. Host systems provide data and access control information via the channels of the storage device and the storage device provides data to the host systems also through the channels. The host systems do not address the disk drives of the storage device directly, but rather, access what appears to the host systems as a plurality of logical disk units. The logical disk units may or may not correspond to the actual disk drives.

Performance of such a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host systems requesting the data.

In instances where the host systems write data to the disk, it may be efficient to have the write operation initially occur only in the cache. The data may then be transferred from the cache back to the disk at a later time, possibly after subsequent read and write operations. Transferring the modified cache data to the disk is referred to as "destaging".

If the cache memory fails after one or more write operations but prior to destaging the modified cache data to the disk, then the disk data may not match the data that was written by the host system. Such a situation may be especially troublesome in instances where the use of the cache is transparent to the host, i.e., in systems where the host system writes data and the write operation is acknowledged by the storage device (because the data is successfully written to the cache), but then the data is never appropriately transferred to the disk because of cache failure. Numerous solutions have been proposed to handle cache failures.

U.S. Pat. Nos. 5,437,022, 5,640,530, and 5,771,367, all to Beardsley et al, disclose a system having two, somewhat— independent, "clusters" that handle data storage. The clusters are disclosed as being designed to store the same data. Each of the clusters includes its disks own cache and non-volatile storage area. The cache from one of the clusters is backed up to the non-volatile data storage area of the other cluster and vice versa. In the event of a cache failure, the data stored in the corresponding non-volatile storage area (from the other cluster) is destaged to the appropriate disk. However, this system requires, in effect, a duplicate backup memory for each of the caches and also provides that whenever data is written to one of the caches, the same data needs to be written to the corresponding non-volatile storage in the other cluster. In addition, since each cluster includes a cache and a non-volatile storage, thus having two redundant clusters requires four memories (one cache for each of the clusters and one non-volatile storage for each of the clusters).

It is desirable to have a system that provides sufficient redundancy in the case of failure of a cache element without unduly increasing the complexity of the system or the number of elements that are needed.

SUMMARY OF THE INVENTION

According to the present invention, managing data in cache includes providing data from a disk storage area to a first cache memory, providing data from the disk storage area to a second cache memory, where the first and second cache memories contain at least some data that is not stored in the other one of the cache memories, and writing the same data to both of the cache memories in response to the data being modified while stored in the cache memories. Managing data in a cache may also include subdividing the first cache memory into primary and secondary storage areas, subdividing the second cache memory into primary and secondary storage areas, where primary areas of the first cache correspond to secondary areas of the second cache and where secondary areas of the first cache correspond to primary areas of the second cache, and providing data from the disk storage area to the one of the cache memories having a corresponding primary storage area. Managing data in a cache memory may also include subdividing the disk storage area into a plurality of slots, where each of the slots corresponds to a primary area of one of the cache memories and to a secondary area of the other one of the cache memories. Managing data in a cache may also include in response to data in a primary area of one of the cache memories being modified, copying related data into the corresponding secondary area of the other one of the cache memories. Managing data in a cache may also include providing control data for each of the areas of the cache memories, where the control data indicates whether the corresponding area has been modified since being provided to one of the cache memories from the disk storage area. Managing data in a cache may also include causing the control data for one of the cache memories to be the same as the control data for the other one of the cache memories. The control data may be written to both of the cache memories at the same time. In response to hardware for the first cache memory failing, the second cache memory may be used. Using the second cache memory may include using portions of the second cache memory corresponding to data provided to the second cache memory from the disk storage area. Managing data in a cache may also include for data stored in the first cache memory but not in the second cache memory, indicating that the data is not stored in cache after the first cache memory fails.

According further to the present invention, managing data in cache includes providing first and second physical cache areas, subdividing each of the first and second physical cache areas into first and second logical cache areas, where portions of the first logical cache area are provided on both the first and second physical cache areas and portions of the second logical cache area are provided on both the first and second physical cache areas, assigning portions of data from a disk storage area to one of: the first logical cache area and the second logical cache area, and providing data from the disk storage area to one of the physical cache areas according to assignment of the data to a particular one of the logical cache areas. Managing data in a cache may also include writing data to both of the physical cache areas in response to the data being modified while stored in the cache. Managing data in a cache may also include providing control data for portions of the physical cache areas, where the control data indicates whether the corresponding portion has been modified since being provided from the disk storage area. Managing data in a cache may also include causing control data from one of the physical cache areas to equal control data from the other one of the physical cache areas. The control data may be written to both of the physical cache areas each time the control data is modified. Managing data in a cache may also include, in response to hardware for one of the physical cache areas failing, using the other one of the physical cache areas.

DETAILED DESCRIPTION OF THE PREFERRED EMBODIMENT(S)

Figure 1A:
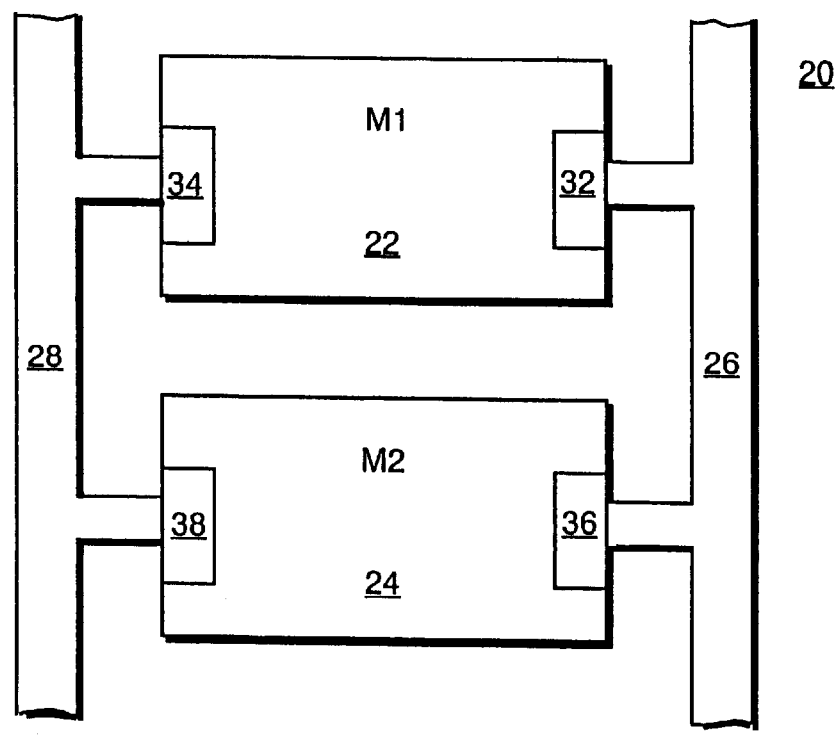
FIG. 1A shows a pair of cache memories where each is coupled to a pair of buses in an embodiment of the system described herein.

Referring to FIG. 1A, a schematic diagram 20 shows a first cache memory 22, and a second cache memory 24 each coupled to a first bus 26 and a second bus 28. The cache memories 22, 24 and the buses 26, 28 may be part of a larger system, such as a data storage device provided by EMC Corporation of Hopkinton, Mass. Data may be written to and read from the memories 22, 24 via the busses 26, 28. The first memory 22 may be coupled to the first bus 26 via a first controller 32 and may be coupled to the second bus 28 via a second controller 34. Similarly, the second memory 24 may be coupled to the first bus 26 via a third controller 36 and may be coupled to the second bus via a fourth controller 38. The busses 26, 28 may be deemed "odd" and "even" for reference purposes. Similarly, the memories 22, 24 may be deemed "top" and "bottom".

In some embodiments, the buses 26, 28 are entirely redundant and each of the buses 26, 28 is coupled to all of the disk controllers (not shown) and host interface units (not shown) of the corresponding storage device. In other embodiments, each of the buses 26, 28 may be connected to a different set of host interface units and disk controllers, possibly with some overlap. Alternatively still, it is possible to have one of the buses 26, 28 couple to all of the host interface units while the other one of the buses 26, 28 is coupled to all of the disk controllers. Configuring and managing the redundancy of the buses 26, 28 may be provided according to a variety of functional factors known to one of ordinary skill in the art, and the system described herein is adaptable to any such configuration. Note that it is possible to further subdivide the busses 26, 28 and the components connected thereto to reduce the likelihood of bringing the whole system down in connection with failure of a bus or of a component thereof.

Figure 1B:
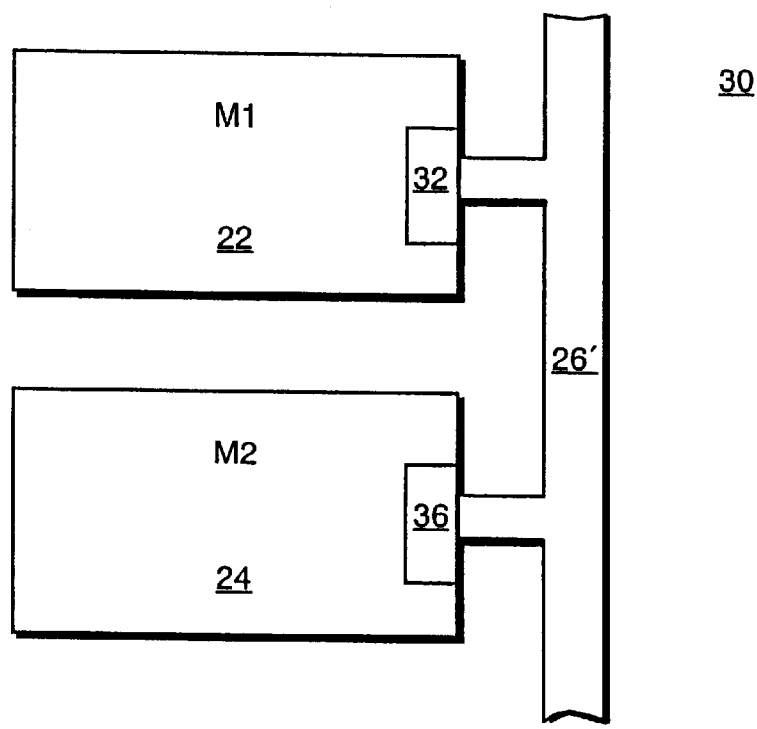
FIG. 1B shows a pair of cache memories coupled to a single bus in an other embodiment of the system discribed herein.

Referring to FIG. 1B, a schematic diagram 30 shows an alternative embodiment where the first cache memory 22 and the second cache memory 24 are both coupled to a single bus 26'. In the embodiment of FIG. 1B, the bus 26' may be coupled to all of the host interface units and all of the disk controllers of the corresponding storage device. The system described herein may be configured with either the embodiment of FIG. 1A, the embodiment of FIG. 1B, or other configurations of one or more buses coupled to the cache memories 22, 24.

Figure 2:
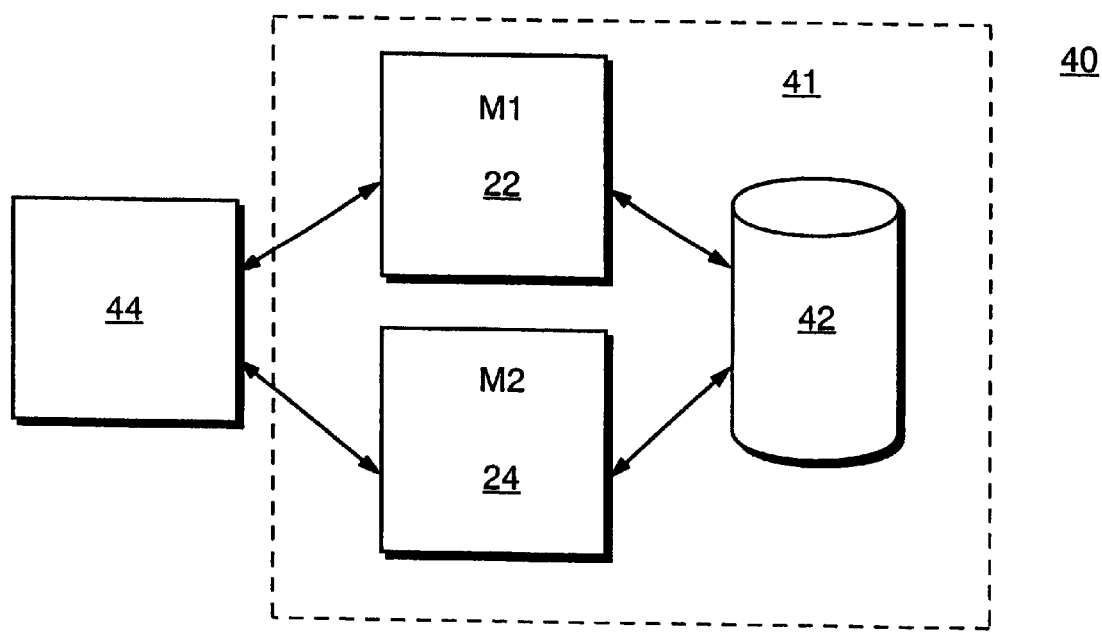
FIG. 2 is a schematic diagram illustrating a host system coupled to a storage system containing a pair of cache memories and a disk storage area according to the system described herein.

Referring to FIG. 2, a schematic diagram 40 illustrates a storage system 41 and the flow of data between the cache memories 22, 24, a disk storage area 42, and a host system 44. Data flows between the first cache memory 22 and the disk storage area 42 and flows between the first cache memory 22 and the host system 44. Similarly, data flows between the second cache memory 24 and the disk storage area 42 and between the second cache memory 24 and the host system 44. Specific control of the data between the hosts system 44, the cache memories 22, 24, and the disk storage area is described elsewhere herein.

Figure 3:
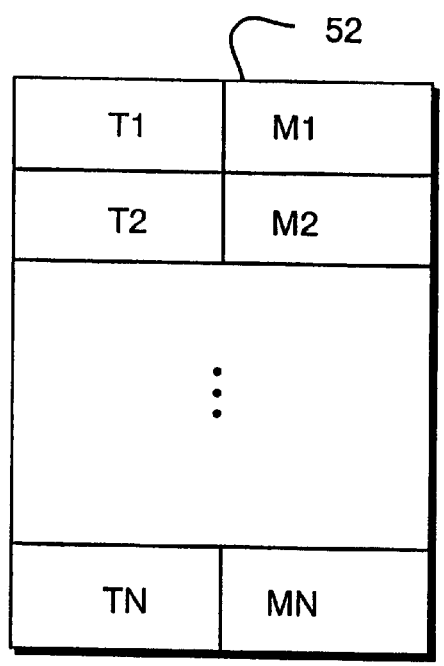
FIG. 3 is a table that may be used to determine primary and secondary cache memories for each of the slots of the disk storage area of the system described herein.

Referring to FIG. 3, a table 52, which is part of the data that is used to control operation of the storage device 41, indicates portions T1, T2 . . . TN of the cache memories 22, 24 that are to be designated as primary storage areas. In one embodiment, the cache memories 22, 24 are mapped alternatively so that, for example, a first set of portions may be designated as primary for the cache memory 22 while a second set of portions may be designated as primary for the cache memory 24, where the first and second sets are interposed. In some embodiments, the portions are 1/4 Gigabyte in size, although it will be apparent to one of ordinary skill in the art that the invention may be practiced using other sizes. The purpose of the mapping is discussed in more detail elsewhere herein.

Figure 4:
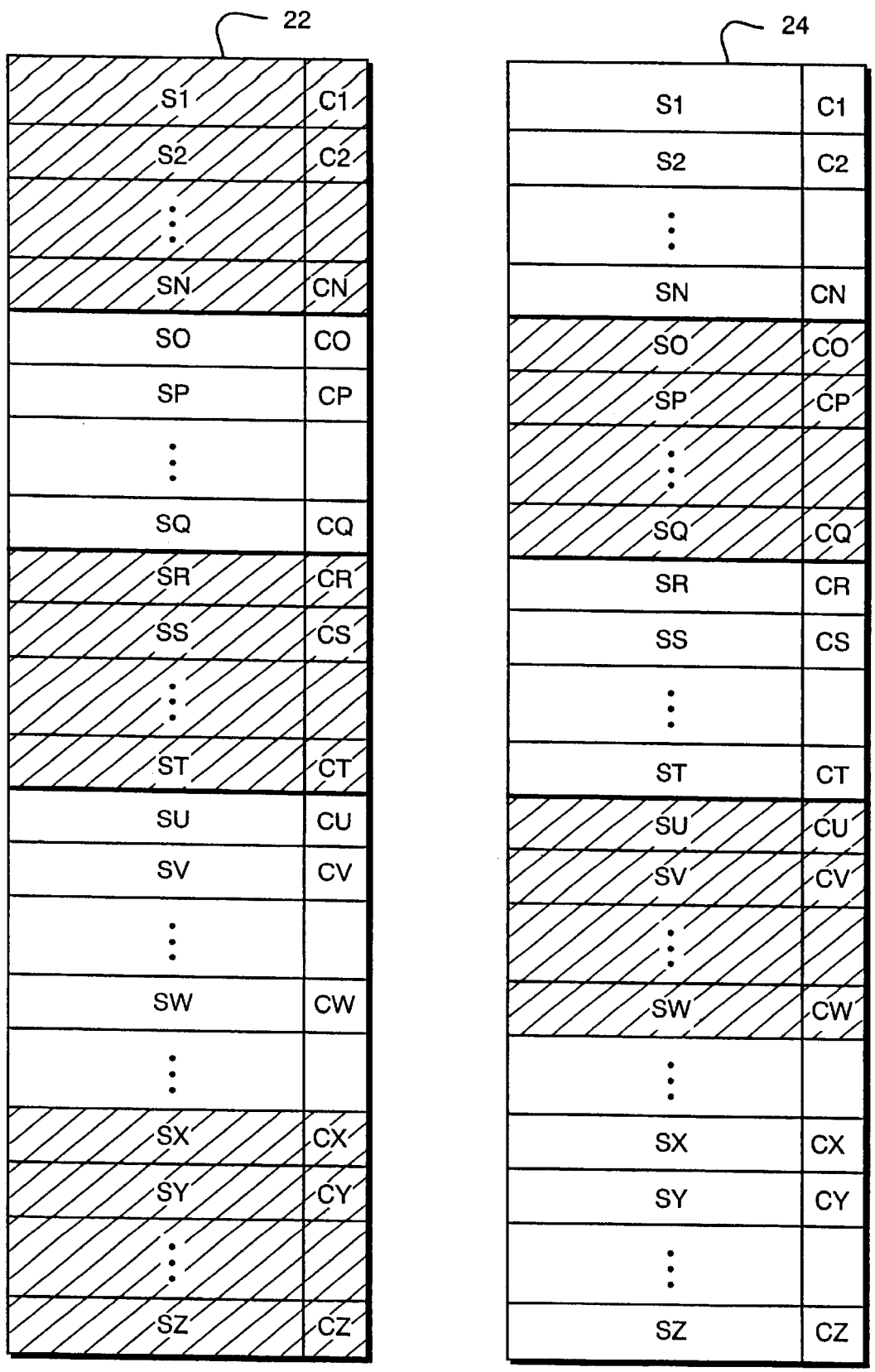
FIG. 4 shows a pair of cache memories having slots and control data associated therewith according to the system described herein.

Referring to FIG. 4, a schematic diagram illustrates the cache memories 22, 24 in more detail. In some embodiments, each of the cache memories 22, 24 is implemented using separate hardware. Each of the memories 22, 24 is shown as containing a plurality of slots S1, S2, . . . SZ which, for embodiments discussed herein, provide storage for a sector of the disk storage area 42. For the embodiments illustrated herein, one sector equals eight blocks and one block equals five hundred and twelve bytes. However, it will be apparent to one of ordinary skill in the art that other sizes may be used without departing from the spirit and scope of the system described herein.

Associated with each of the slots may be specific control data elements C1, C2, . . . CZ, so that control data element C1 is associated with slot S1, control data element C2 is associated with slot S2, and so forth. For the system described herein, there is control data associated with each block and each sector. In addition, in some embodiments, it is possible to indicate that particular blocks of data are write pending, rather than indicating that an entire sector, to which the block belongs, is write pending. However, the discussion herein will emphasize control data and the write pending state for sectors.

Each of the slots represents data that is read from the disk storage area 42 and stored in one or both of the cache memories 22, 24. The control data for each of the slots indicates the state of the data in the slot. Thus, for example, the control data element for a slot can indicate that the data has been read from the disk storage area 42 but not written to by the host 44 (i.e., not modified by the host 44). Alternatively, the control data element for a slot could indicate that the data in the slot has been written to by the host 44 since being read from the disk storage area 42 (i.e., write pending). Note that, generally, data that is read from the disk storage area 42 but not subsequently modified may be eliminated from the cache without any ultimate loss of data since the data in the memories 22, 24 is the same as the data in the disk storage area 42. On the other hand, data that is write pending (i.e., modified while in the memories 22, 24 after being read from the disk storage area 42) is written back to the disk storage area 42 for proper data synchronization. Note also that the control data could indicate that the associated slot contains data that is the same in both of the memories 22, 24, which could occur, for example, either when the data is write pending or immediately after data that is write pending si written to the disk.

In one embodiment, data that is read from the disk storage area 42 is written to one or the other of the memories 22, 24. The shading of the slots in the memories 22, 24 in FIG. 4 indicates that a slot has been designated as a secondary slot. Thus, for example, the slots S1, S2 . . . SN of the cache memory 22 are designated as secondary slots while the slots SO, SP, . . . SQ of the cache memory 24 are designated as secondary slots. Conversely, the slots SO, SP, . . . SQ of the cache memory 22 are designated as primary slots while the slots S1, S2, . . . SN of the cache memory 24 are designated as primary slots.

In one embodiment, data that is read from the disk storage area 42 is written only to the corresponding primary slot and, at least initially, is not written to the secondary slot. Thus, for example, if a sector of data is to be provided in slot S1, the data is read from the disk and is initially written only to the cache memory 24. Similarly, data from the disk designated for slot SP is initially written only to the cache memory 22. The hardware may be used, in a conventional manner, to control writing to one of the cache memories 22, 24 or writing to both of the memories 22, 24 simultaneously (and/or with a single command). Similarly, the hardware may control which of the memories 22, 24 is read.

If an event occurs causing data in the cache memories 22, 24 to change (such as a write from the host 44), then the modified data is written to both the primary memory and to the secondary memory. For example, data that is designated for slot S1 is initially written from the disk storage area 42 only to the cache memory 24. However, if a subsequent operation occurs that causes the data in slot S1 to change (i.e., a write by the host 44 to the portion of the disk storage area 42 corresponding to slot S1), then the data in slot S1 is modified according to the write operation which writes data to both of the memories 22, 24. Thus, data that is write pending exists in both of the cache memories 22, 24. Note that, in some instances, unmodified but related data in a slot may be copied from one of the memories 22, 24 to the other one of the memories 22, 24.

The state of the data in the slots is indicated by the control data. Thus, in the case of data that has not been modified, the corresponding control data element indicates that the data has not been modified while, in the case of data that has been modified, the corresponding control data element indicates that the data is write pending. The control data for the slots is written to both of the cache memories 22, 24. Thus, in the event of loss of the hardware associated with one of the cache memories 22, 24, the entirety of the control data will exist in the non-failing one of the cache memories 22, 24. Stated differently, the control data information in one of the cache memories 22, 24 is identical to the control data information in the other one of the cache memories 22, 24.

Note that any data that is write pending in the cache is provided in both of the cache memories 22, 24. On the other hand, data that does not need to be written back to the disks (i.e., data that has not been modified by the host 44) is stored in only one of the cache memories 22, 24. Storing the data in only one of the cache memories 22, 24 is an optimization that can increase performance by requiring only one write to one of the cache memories 22, 24 in certain instances, while providing a mechanism where write pending cache data is written to both of the cache memories 22, 24. In addition, note that, as discussed above, identical data may be stored in corresponding slots in both of the memories 22, 24 even though the data is not write pending. This may occur, for example, immediately after write pending data is copied to the disk.

Figure 5:
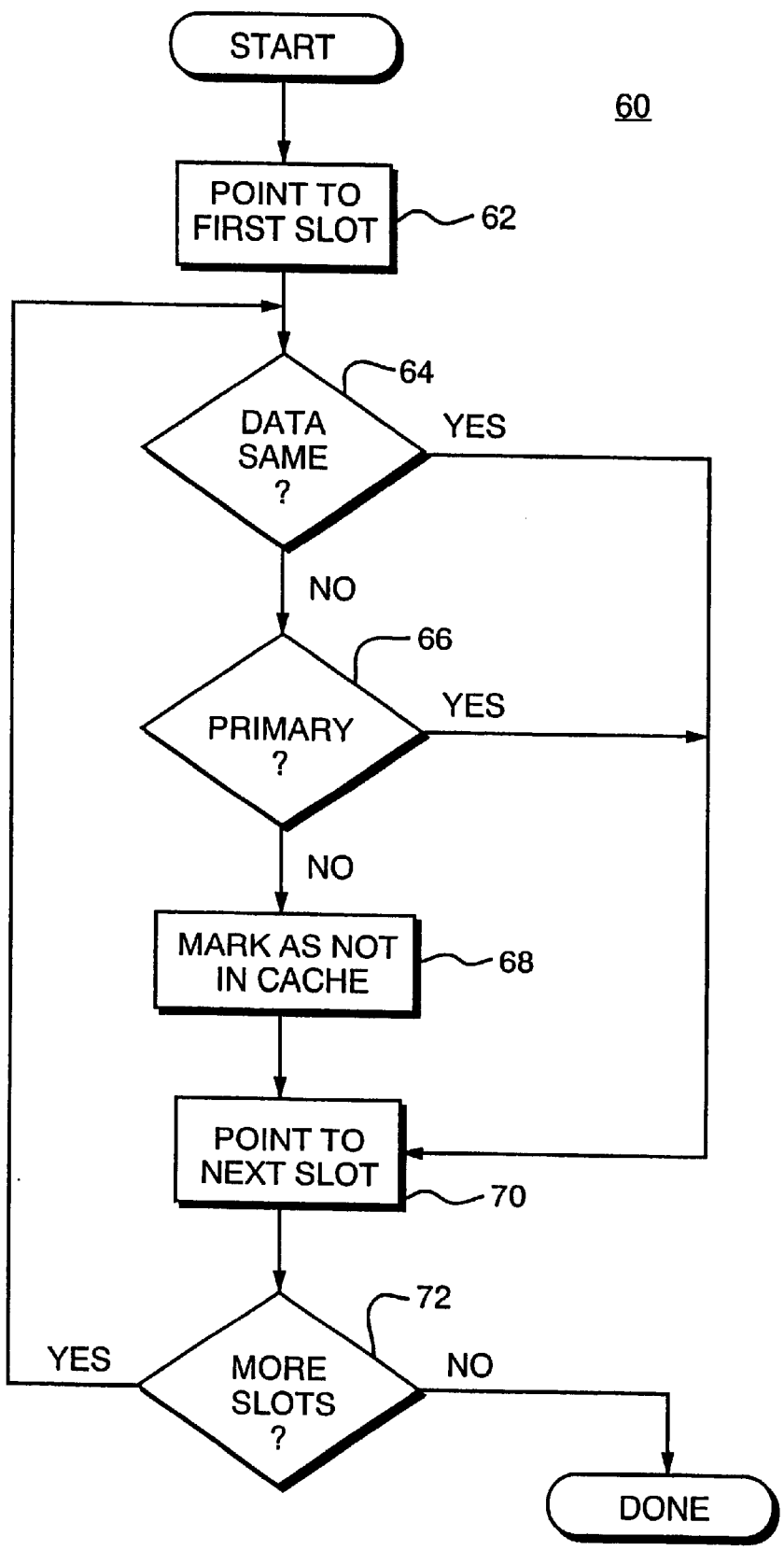
FIG. 5 is a flow chart illustrating steps performed in connection with failure of the hardware associated with one of the pair of cache memories.

Referring to FIG. 5, a flow chart 60 illustrates steps performed in the event that the hardware associated with one of the cache memories 22, 24 fails. Implementing each of the cache memories 22, 24 with separate hardware increases the likelihood that failure of the hardware for one of the cache memories 22, 24 will not occur at the same time as failure of the hardware for an other one of the cache memories 22, 24. Detection of the failure of one of the cache memories 22, 24 is provided in a straightforward manner, such as described in U.S. Pat. No. 5,742,501 to Dewey et al., which is incorporated by reference herein. Note that detection of a failure may occur during an initial self test.

Processing begins at a first step 62 where a pointer is set to point to the first slot of the good cache memory (i.e., the one of the cache memories 22, 24 that has not failed). Following the step 62 is a test step 64 where it is determined if the data stored in the slot that is pointed to is duplicated in the memories (i.e., is the same for both of the memories 22, 24). As discussed above, this is indicated by the corresponding control data for the slot. Note that this information is available irrespective of whether the slot of the non-failing one of the cache memories 22, 24 is a primary or a secondary storage area, since all of the control data is duplicated between the cache memories 22, 24, as discussed elsewhere herein.

If it is determined at the test step 64 that the data for the slot is not the same for both of the memories 22, 24, then control passes from the test step 64 to a test step 66 where it is determined if the non-failing cache memory (i.e., the one of the cache memories 22, 24 that is being examined) is the primary storage area for the data. If it is determined at the test step 66 that the slot being examined is not the primary storage area for the data (and thus the data is not stored in the non-failing cache memory), then control passes from the test step 66 to a step 68 where the control data for the slot is modified to indicate that the corresponding data is not in the cache. The step 68 is executed because the data corresponding to the slot being examined is stored in the failed one of the cache memories 22, 24 and thus, effectively, is no longer in the cache.

Following the step 68 is a step 70 where the next slot of the non-failing cache is pointed to in order to be examined on the next iteration. Following the step 70 is a test step 72 where it is determined if processing is complete (i.e., no more slots remain to be examined). If it is determined at the test step 72 that there are more slots to examine, then control transfers back to the step 64 to process the next slot.

Note that the step 70 is also reached from the step 64 if it is determined that the data is the same in both of the memories 22, 24 and that the step 70 is also is reached from the test step 66 if it is determined that the data, although not the same in both of the memories 22, 24, is stored in the non-failing one of the cache memories 22, 24. This is because, in either of these cases, it is not necessary to mark the control data for the slot being examined as indicating that the data is not in cache at the step 68.

Figure 6:
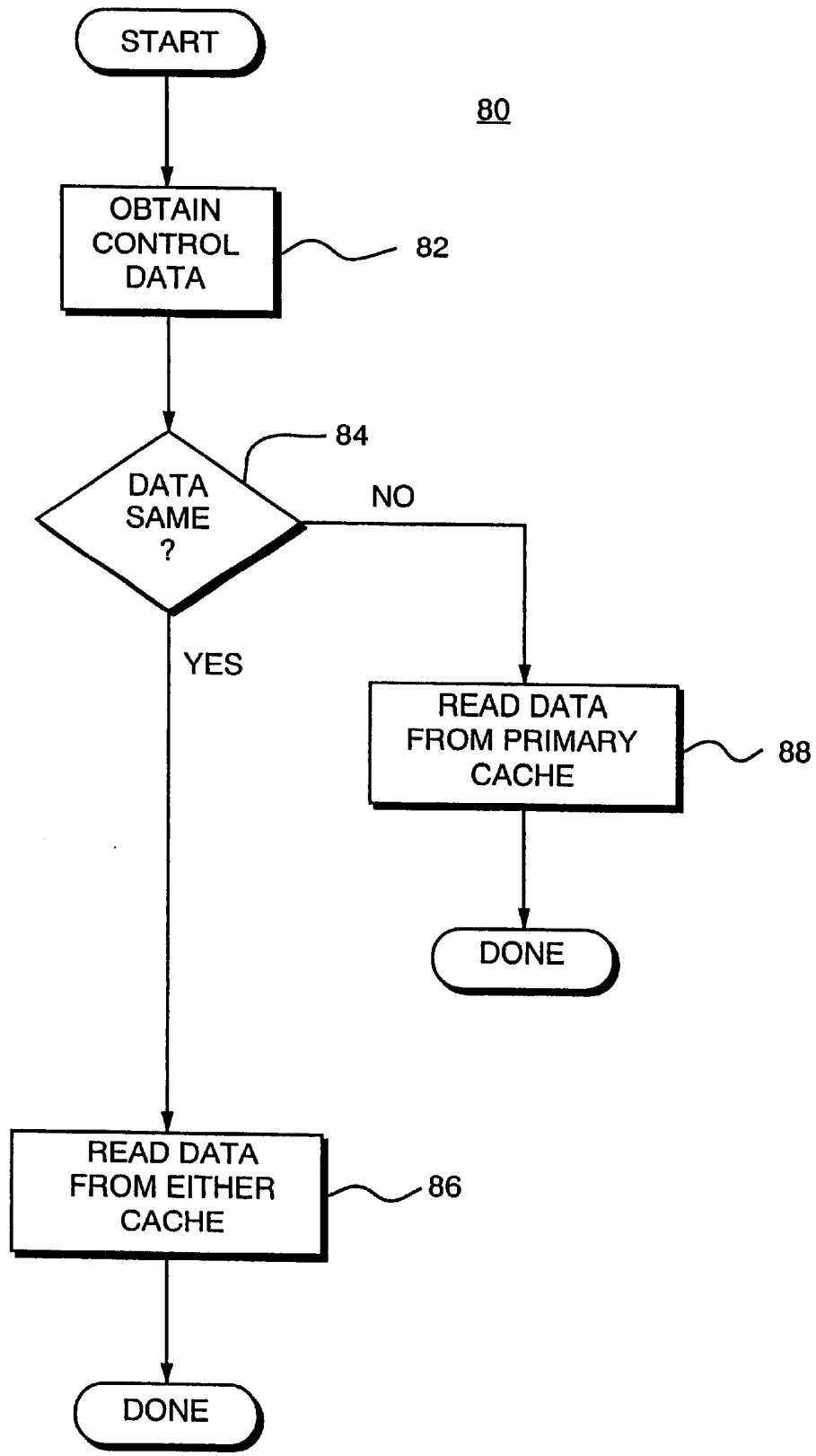
FIG. 6 is a flow chart illustrating steps performed in connection with a host accessing data in the cache memories.

Referring to FIG. 6, a flow chart 80 illustrates steps performed in connection with a read operation executed by the host where the data being read is in one or both of the cache memories 22, 24. Note that, if the hardware for one of the cache memories 22, 24 fails, then only one of the cache memories 22, 24 is used for all data read and write operations. However, in the course of normal operation, both of the cache memories 22, 24 are used to store data.

Processing begins at a first step 82 where the control data for the data being accessed is obtained. Note that, as discussed elsewhere herein, the control data is duplicated between the cache memories 22, 24. Thus, the selection of one of the cache memories 22, 24 from which to read the control data at the step 82 may be random, or may be alternative (i.e., round robin), or may be some other scheme that may or may not provide for balancing accesses and/or performance enhancement between the cache memories 22, 24. In some embodiments, it may be desirable to provide load balancing and/or performance enhancement in connection with read operations.

Following the step 82 is a step 84 where it is determined if the data is the same in both of the memories 22, 24. As discussed above, this information may be provided by the corresponding control data element. If it is determined at the test step 84 that the data is the same in both of the memories 22, 24, then the data may be read from either one of the cache memories 22, 24. Thus, if it is determined at the step 84 that the data is the same in both of the cache memories 22, 24, then control passes from the step 84 to a step 86, where the data is read from either of the cache memories 22, 24. In some embodiments, at the step 86 the data is read from the one of the cache memories 22, 24 that is used at the step 82 to obtain the control data. In other embodiments, at the step 86 the data is read from the one of the cache memories 22, 24 opposite to the one of the cache memories 22, 24 that is used at the step 82. Following the step 86, processing is complete.

If it is determined at the test step 84 that the data that is not the same in both of the cache memories 22, 24, then control passes from the test step 84 to a test step 88 where the data is read from the primary cache for the data. The distinction between primary and secondary cache storage is discussed elsewhere herein. Following the step 88, processing is complete.

Figure 7B:
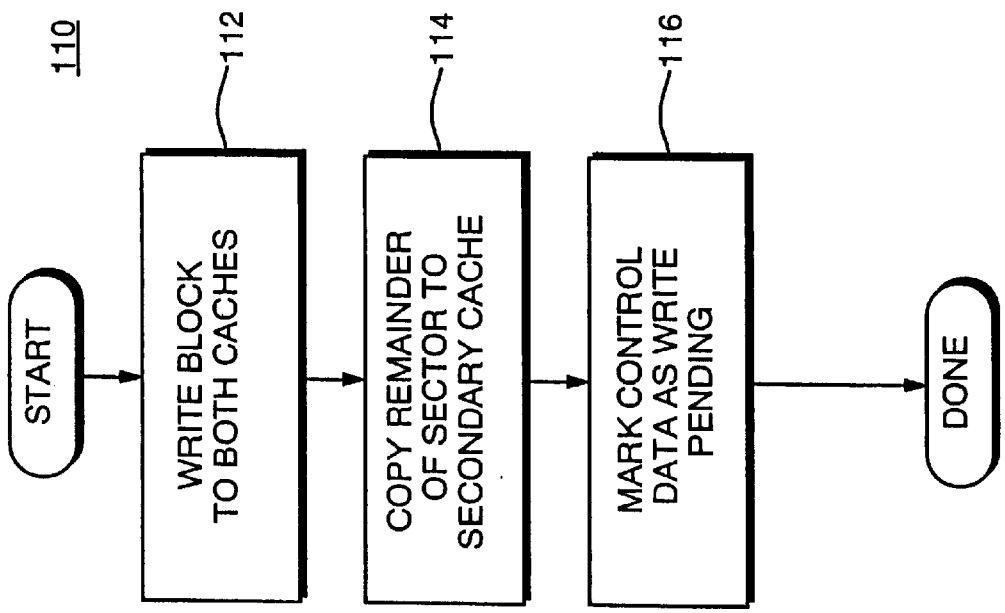
FIG. 7B is a flow chart illustrating steps performed in connection with handling data that is modified after the data has been read into the cache according to the system described herein.
Figure 7A:
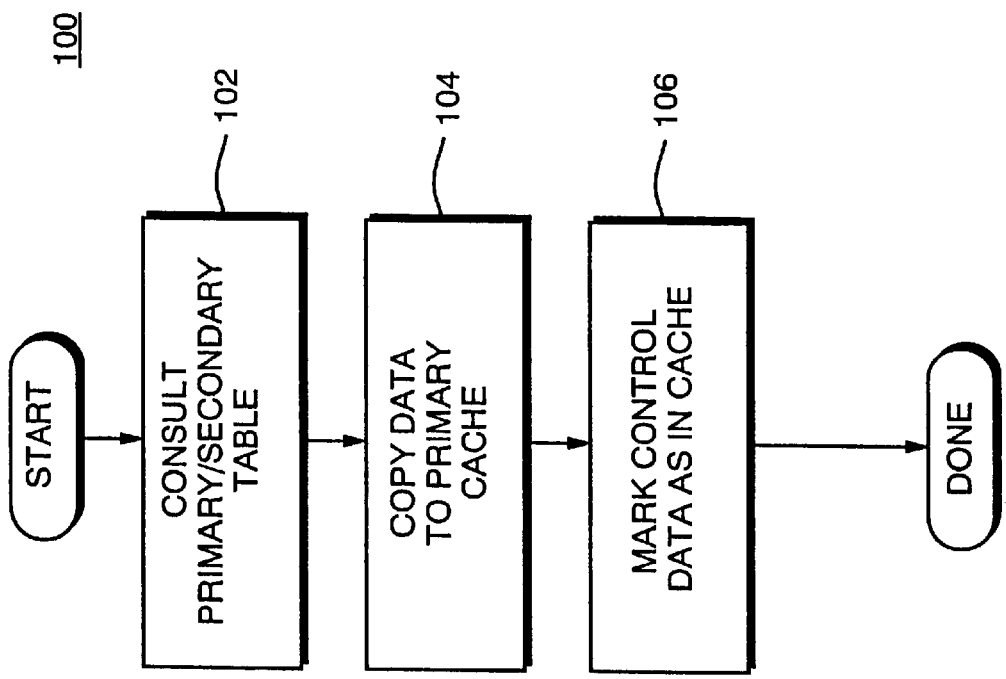
FIG. 7A is a flow chart illustrating steps performed in connection with providing data from the disk storage area to the cache memories according to the system described herein.

Referring to FIG. 7A, a flow chart 100 illustrates steps performed in connection with providing data from the disk storage area 42 to the cache memories 22, 24. At a first step 102, it is determined which of the memories 22, 24 is the primary storage area for the data. Following the step 102 is a step 104 where the data is copied from the disk storage area 42 to the one of the memories 22, 24 corresponding to the primary storage area. Following the step 104 is a step 106 where the corresponding control data element, for both of the cache memories 22, 24, is marked to indicate that the corresponding data is in cache, thus indicating that the data has been read in to the cache. As discussed above, the control data for each of the slots of the cache memories 22, 24 is duplicated. Thus, the control data element for any slot in one of the cache memories 22, 24 is made to equal the control data for the slot in the other one of the cache memories 22, 24 by writing the control data to both of the memories 22, 24 at the step 106. Following the step 106, processing is complete.

Referring to FIG. 7B, a flow chart 110 indicates steps performed in connection with the data in the cache that has been modified (e.g., by a write from the host 44). Note that the steps of the flow chart 110 may be executed some time after the data has been read from the disk storage area 41 in to the cache or may never be executed at all for some of the cache data.

At a first step 112, the block of data that is being modified (i.e., by the host 44) is written to both of the cache memories 22, 24. In each instance where data is modified, it is written to both of the caches 22, 24. However, the first time data from a slot (sector) is modified while in cache, other steps are also taken, as described below.

Following the step 112 is a step 114 where the remainder of the sector that includes the modified block is copied from the primary cache to the secondary cache. As discussed above, the embodiments disclosed herein operate a sector at a time, although is would be apparent to one of ordinary skill in the art how to adapt the system to operate using different size data increments, such as a block. Thus, if the control data is provided on a per block basis, and if the cache holds and manipulates data in units of blocks, then it may be possible to forego the step 114. Note also that if the control data indicates that the data for the sector is the same in both of the memories 22, 24, then the step 114 may be omitted, since there would be no need to copy data that is already the same.

Following the step 114 is a step 116 where the control data for the particular slot, in both of the memories 22, 24, is marked to indicate that the slot is write pending, indicating that the data has been modified while stored in the cache. As discussed above, the control data is written to both the primary and secondary storage areas. Following step 116, processing is complete. Note that when the write pending data is destaged, the control data may indicate that the data is no longer write pending although the control data may also indicate that the sector data in both of the memories 22, 24 is identical.

The cache memories 22, 24 may be configured as separate memory boards (separate hardware) and, in some embodiments, may each have their own power supply. Using separate hardware for each of the cache memories 22, 24 decreases the likelihood that both of the cache memories 22, 24 will fail simultaneously. Thus, when the hardware for one of the cache memories 22, 24 fails, the process set forth in FIG. 5, discussed above, may be executed to reconfigure the system to operate using a single cache memory.

Following a failure, it may be possible to replace the failed hardware while the system is operational using techniques for doing so that are discussed, for example, in U.S. Pat. No. 6,078,503 to Gallagher et al., which is incorporated by reference herein. However, once the hardware for the failed memory board is replaced, it is necessary to have a plan for recovery so that the system can use both of the cache memories 22, 24 in connection with normal operation.

Figure 8:
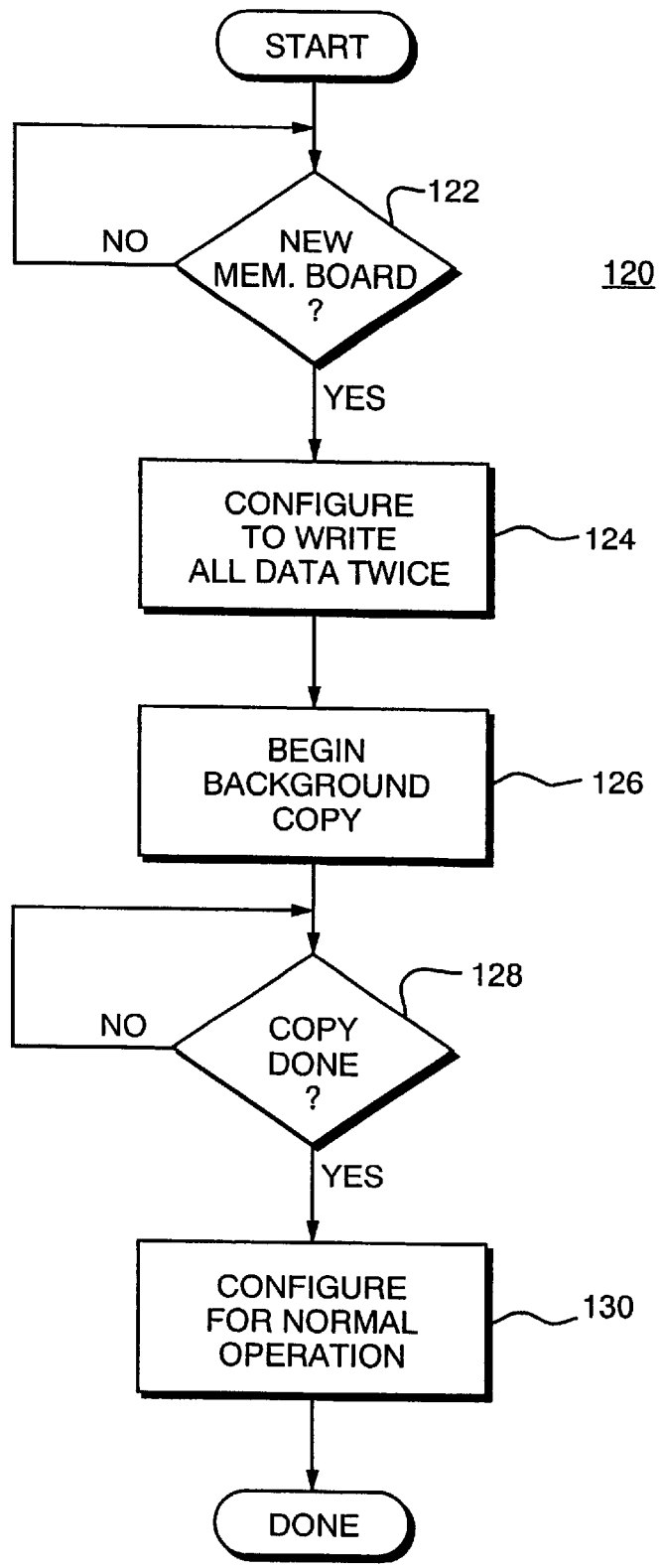
FIG. 8 is a flow chart illustrating steps performed in connection with recovery after failure and replacement of the hardware associated with one of the cache memories.

Referring to FIG. 8, a flow chart 120 illustrates steps performed after the hardware for one of the cache memories has failed. Processing begins at a first step 122 which determines if the failed memory hardware has been replaced. The test step 122 represents waiting until new, operational, hardware for the failed memory board is installed. Thus, until the hardware for the failed memory is replaced, the step 122 loops back on itself. Stated differently, the remaining steps of the flowchart 120 are not performed unless and until the failed memory board is successfully replaced.

Once the hardware for the failed memory has been replaced, control passes from the step 122 to a step 124 where the system is configured to write all data to both of the cache memories 22, 24. That is, every time data is read from the disk storage area 42 to the cache, or data that is in the cache is modified by the host 44, the data is written to both of the cache memories 22, 24.

Following the step 124 is a step 126 where background copying is begun. Background copying refers to copying data from the non-failing one of the cache memories 22, 24 to the other one of the cache memories 22, 24 that corresponds to the new memory hardware. Background copying occurs when the cache is otherwise not being used. Thus, the steps 124, 126 cause the cache memories 22, 24 to eventually become duplicates of each other.

Following the step 126 is a test step 128 which determines if background copying is complete. If not, the step 128 loops back on itself to wait for completion. Otherwise, once background copying is complete, the cache memories 22, 24 are duplicates of each other and control passes from the step 128 to a step 130, where the system is reconfigured to operate in the usual manner as discussed above in connection with the FIG. 6, FIG. 7A, and FIG. 7B. Thus, when the hardware for one of the cache memories 22, 24 fails, the system operates with the single, non-failing cache memory. However, once the recovery process set forth in FIG. 8 is completed, then the system is reconfigured to have a primary and secondary cache and to operate in the usual manner, as discussed above.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of managing data in cache, comprising:
providing data from a disk storage area to a first cache memory;
providing data from the disk storage area to a second cache memory, wherein at least some of the data that is provided to the first cache memory is not provided to the second cache memory and at least some of the data that is provided to the second cache memory is not provided to the first cache memory; and
writing the same data to both of the cache memories in response to the data being modified while stored in the cache memories.

2. A method, according to claim 1, further comprising:
subdividing the first cache memory into primary and secondary storage areas;
subdividing the second cache memory into primary and secondary storage areas, wherein primary areas of the first cache correspond to secondary areas of the second cache and wherein secondary areas of the first cache correspond to primary areas of the second cache; and
providing data from the disk storage area to the one of the cache memories having a corresponding primary storage area.

3. A method, according to claim 2, further comprising:
subdividing the disk storage area into a plurality of slots, wherein each of the slots corresponds to a primary area of one of the cache memories and to a secondary area of the other one of the cache memories.

4. A method, according to claim 2, further comprising:
in response to data in a primary area of one of the cache memories being modified, copying related data into the corresponding secondary area of the other one of the cache memories.

5. A method, according to claim 1, further comprising:
providing control data for each of the areas of the cache memories, wherein the control data indicates whether the corresponding area has been modified since being provided to one of the cache memories from the disk storage area.

6. A method, according to claim 5, further comprising:
causing the control data for one of the cache memories to be the same as the control data for the other one of the cache memories.

7. A method, according to claim 6, further comprising:
writing control data to both of the cache memories at the same time.

8. A method, according to claim 1, further comprising:
in response to hardware for the first cache memory failing, using the second cache memory.

9. A method, according to claim 8, wherein using the second cache memory includes using portions of the second cache memory corresponding to data provided to the second cache memory from the disk storage area.

10. A method, according to claim 8, further comprising:
for data stored in the first cache memory but not in the second cache memory, indicating that the data is not stored in cache after the first cache memory fails.

11. A method of managing data in cache, comprising:
providing first and second physical cache areas;
subdividing each of the first and second physical cache areas into first and second logical cache areas, wherein portions of the first logical cache area are provided on both the first and second physical cache areas and portions of the second logical cache area are provided on both the first and second physical cache areas;
assigning portions of data from a disk storage area to one of: the first logical cache area and the second logical cache area; and
providing data from the disk storage area to one of the physical cache areas according to assignment of the data to a particular one of the logical cache areas.

12. A method, according to claim 11, further comprising:
writing data to both of the physical cache areas in response to the data being modified while stored in the cache.

13. A method, according to claim 11, further comprising:
providing control data for portions of the physical cache areas, wherein the control data indicates whether the corresponding portion has been modified since being provided from the disk storage area.

14. A method, according to claim 13, further comprising:
causing control data from one of the physical cache areas to equal control data from the other one of the physical cache areas.

15. A method, according to claim 14, wherein the control data is written to both of the physical cache areas each time the control data is modified.

16. A method, according to claim 11, further comprising:
in response to hardware for one of the physical cache areas failing, using the other one of the physical cache areas.

17. A memory device, comprising:
a disk storage area;
a first cache memory that is provided data by said disk storage area;
a second cache memory that is provided data by said disk storage area, wherein at least some of the data that is provided to the first cache memory is not provided to the second cache memory and at least some of the data that is provided to the second cache memory is not provided to the first cache memory and wherein data is provided to both of the cache memories in response to the data being modified while stored in one of the cache memories.

18. A memory device, according to claim 17, wherein said first and second cache memories have substantially the same storage capacity.

19. A memory device, according to claim 17, wherein the first cache memory is subdivided into primary and secondary storage areas and the second cache memory is subdivided into primary and secondary storage areas, the primary areas of the first cache memory corresponding to secondary areas of the second cache memory and the secondary areas of the first cache memory corresponding to primary areas of the second cache memory.

20. A memory device, according to claim 19, wherein data from the disk storage area is provided to the one of the cache memories having a corresponding primary storage area.

21. A memory device, according to claim 20, wherein the disk storage area is subdivided into a plurality of slots, each of the slots corresponding to a primary area of one of the cache memories and to a secondary area of the other one of the cache memories.

22. A memory device, according to claim 20, wherein related data is copied into a corresponding secondary area of the other one of the cache memories in response to data in a primary area of one of the cache memories being modified.

23. A memory device, according to claim 19, wherein control data provided to each of the cache memories indicates whether the corresponding area has been modified since being provided to one of the cache memories from the disk storage area.

24. A memory device, according to claim 23, wherein the control data for one of the cache memories is the same as the control data for the other one of the cache memories.

25. A memory device, according to claim 24, wherein control data is written to both of the cache memories at the same time.

26. A memory device, according to claim 19, wherein the second cache memory is used in response to hardware for the first cache memory failing.

27. A memory device, according to claim 26, wherein data is not stored in cache after the first cache memory fails.

28. A memory device, comprising:
a disk storage area;
a first physical cache area subdivided into a first logical cache area and a second logical cache area, wherein data from the disk storage area is assigned to one of the first and the second logical cache areas of the first physical cache area; and
a second physical cache area subdivided into a first logical cache area and a second logical cache area, wherein data from the disk storage area is assigned to one of the first and the second logical cache areas of the second physical cache area and wherein data is provided from said disk storage area to one of said first and second physical cache areas according to assignment of the data to one of the logical cache areas.

29. A memory device, according to claim 28, wherein said first and second physical cache areas have substantially the same storage capacity.

30. A memory device, according to claim 28, wherein said first and second logical cache areas have substantially the same storage capacity.

31. A memory device, according to claim 28, wherein data is provided to both of the physical cache areas in response to the data being modified while stored in the cache.

32. A memory device, according to claim 28, wherein control data is provided to the physical cache areas to indicate whether corresponding portions of data in the physical cache areas has been modified since being provided from the disk storage area.

33. A memory device, according to claim 32, wherein control data from one of the physical cache areas is the same as control data from a corresponding portion of the other one of the physical cache areas.

34. A memory device, according to claim 33, wherein the control data is written to both of the physical cache areas each time the control data is modified.

35. A memory device, according to claim 28, wherein the other one of the physical cache areas is used in response to hardware for one of the physical cache areas failing.

* * * * *